(12) United States Patent
Altekar et al.

(10) Patent No.: US 8,996,720 B2
(45) Date of Patent: Mar. 31, 2015

(54) METHOD AND APPARATUS FOR MIRRORING FRAMES TO A REMOTE DIAGNOSTIC SYSTEM

(75) Inventors: Satsheel Bhasker Altekar, San Jose, CA (US); Venkata Pramod Balakavi, San Jose, CA (US); Kung-Ling Ko, Union City, CA (US); Surya Prakash Varanasi, Dublin, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 458 days.

(21) Appl. No.: 12/725,171

(22) Filed: Mar. 16, 2010

(65) Prior Publication Data

US 2011/0231570 A1    Sep. 22, 2011

(51) Int. Cl.
*G06F 15/173* (2006.01)
*H04L 12/26* (2006.01)
*H04L 12/46* (2006.01)

(52) U.S. Cl.
CPC ............. *H04L 43/12* (2013.01); *H04L 12/4633* (2013.01)
USPC ............................. 709/236; 709/238; 370/474

(58) Field of Classification Search
CPC ............ H04L 12/4633; H04L 63/0428; H04L 43/026; H04L 43/12
USPC .......... 709/227, 224, 236, 238; 370/248, 390, 370/216, 392, 245, 474; 726/26
See application file for complete search history.

(56) References Cited

U.S. PATENT DOCUMENTS

| 6,041,042 A * | 3/2000 | Bussiere ....................... 370/245 |
| 7,009,968 B2 | 3/2006 | Ambe |
| 7,031,304 B1 | 4/2006 | Arberg |
| 7,188,189 B2 | 3/2007 | Karol |
| 7,292,573 B2 | 11/2007 | LaVigne |
| 7,506,065 B2 | 3/2009 | LaVigne |
| 7,555,562 B2 | 6/2009 | See |
| 7,606,203 B1 | 10/2009 | Shabtay |
| 7,690,040 B2 * | 3/2010 | Frattura et al. .................. 726/26 |
| 7,706,363 B1 | 4/2010 | Daniel |
| 7,747,737 B1 | 6/2010 | Apte |
| 8,239,960 B2 | 8/2012 | Frattura |
| 8,615,008 B2 | 12/2013 | Natarajan |
| 2004/0003094 A1 * | 1/2004 | See ............................... 709/227 |
| 2005/0278565 A1 | 12/2005 | Frattura |
| 2006/0182112 A1 * | 8/2006 | Battle et al. ................... 370/392 |
| 2008/0291823 A1 * | 11/2008 | Saltsidis ....................... 370/216 |
| 2009/0129384 A1 * | 5/2009 | Regan ........................... 370/390 |
| 2009/0190481 A1 * | 7/2009 | Kobayashi et al. ........... 370/248 |

* cited by examiner

*Primary Examiner* — Jungwon Chang
(74) *Attorney, Agent, or Firm* — Wong, Cabello, Lutsch, Rutherford & Brucculeri, L.L.P.

(57) ABSTRACT

Apparatuses and methods to mirror frames received at an input port or provided by an output port to a port not connected to the device performing the mirroring operation. A frame being sent to a diagnostic system has a mirror header added to allow the frame to be routed through any intervening switches in the same fabric. The final switch or the diagnostic system removes the mirror header. If the diagnostic system is attached in a different fabric, encapsulation and inter-fabric routing headers are added as needed to the frame containing the mirror header. This allows the frame to traverse multiple fabrics to reach the diagnostic system. The encapsulation and inter-fabric routing headers are removed as done normally. This allows a diagnostic system to be connected to any switch in the network, either in the same or a different fabric.

5 Claims, 5 Drawing Sheets

US 8,996,720 B2

METHOD AND APPARATUS FOR MIRRORING FRAMES TO A REMOTE DIAGNOSTIC SYSTEM

BACKGROUND OF THE INVENTION

1. Field of the Invention

Embodiments according to the invention relate to a method and apparatus for frame mirroring in a network environment. More particularly, embodiments according to the invention relate to mirroring frames to a diagnostic system not connected to the device performing the mirror operation.

2. Description of the Related Art

Effectively deploying multiple devices in a network environment becomes an increasingly complex task as transmission data rates, processor speeds, and storage capacities increase. Storage area networks (SANs) have been developed as specialized high-speed networks, referred to as fabrics, to connect computer systems, control software, and storage devices over the fabric. A SAN typically allows block level input/output (I/O) rather than file-level access. Thus, every device connected to a SAN fabric appears as a locally attached device to other devices on the fabric.

Data rates of the switches which form the SAN are currently very high, such as 8 Gbps. At these rates diagnostics become very difficult. This makes simple trace capture inside the switch difficult as the needed memory could easily exceed that needed for normal switch operations. Protocol analyzers are readily available, but their operation commonly requires that they be connected in series with the input or output port being tested. This makes connection of a conventional protocol analyzer troublesome in many instances. One approach that has been used to alleviate this problem is to mirror selected frames to a designated port connected to a diagnostic system. However, this approach has been limited because of a requirement that the diagnostic system be directly connected to the switch performing the mirroring. In a practical sense this meant that the diagnostic system had to be connected to either the same switch as the frame source or the frame destination. While better than being required to be in series, this direct connection requirement still limited the flexibility of the SAN configuration unduly, requiring reconfiguration should the diagnostic system not be connected to one of the necessary switches, assuming that the switches can perform the mirror approach.

SUMMARY OF THE INVENTION

One or more embodiments according to the invention relate to remote port mirroring, which includes apparatuses and methods to mirror frames received at an input port or provided by an output port to a port not connected to the device performing the mirroring operation. A frame being sent to the diagnostic system has a mirror header added to allow the frame to be routed through any intervening switches in the same fabric to the diagnostic device. Either the final switch or the diagnostic system removes the mirror header and then the diagnostic system can analyze the mirrored frame as needed. If the diagnostic system is attached in a different fabric, encapsulation and inter-fabric routing headers are added as needed to the frame containing the mirror header. This allows the frame to traverse multiple fabrics to reach the diagnostic system. The encapsulation and inter-fabric routing headers are removed as done normally, leaving only the mirror header for routing in the final fabric. This allows a diagnostic system to be connected to any switch in the network, either in the same or a different fabric.

DETAILED DESCRIPTION

Reference will now be made in detail to several embodiments of the invention, examples of which are illustrated in the accompanying drawings. Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment. Wherever practicable, the same reference numbers will be used throughout the drawings to refer to the same or like parts.

Figure 1A:
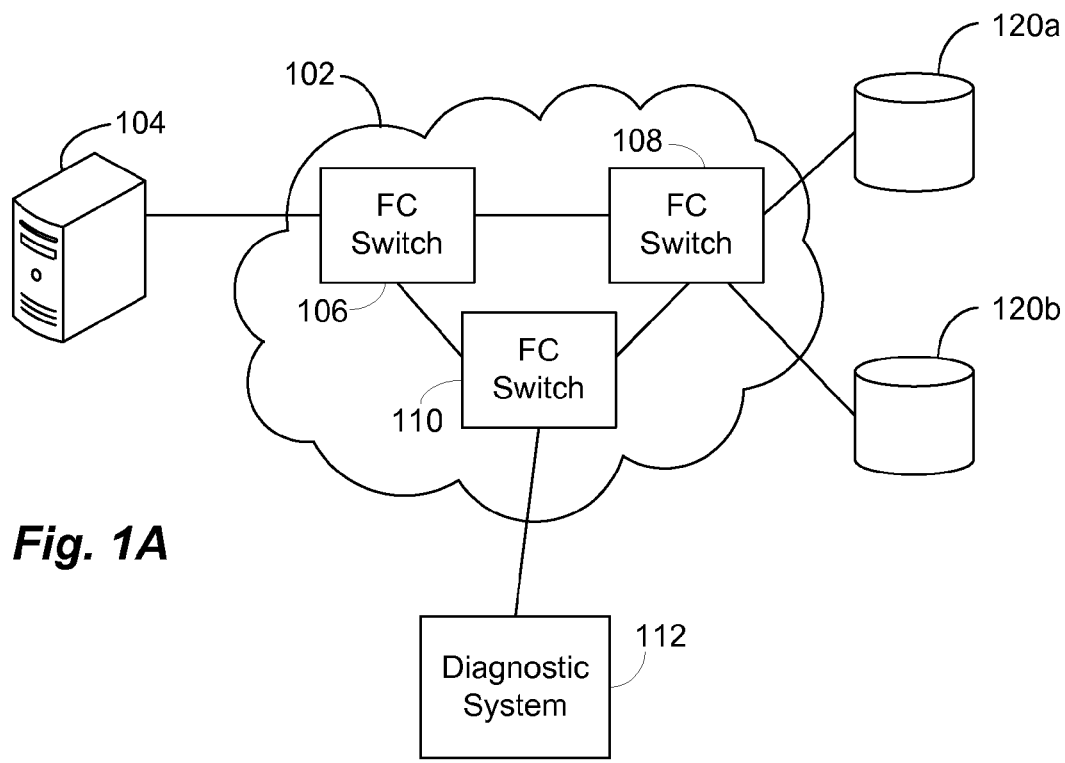
FIG. 1A is a schematic representation of a single fabric network according to an embodiment of the present invention.

FIG. 1A shows components in a network 100. A fabric 102 includes interconnected Fibre Channel (FC) switches 106, 108, 110 according to the present invention. A host 104 is connected to FC switch 106. One or more storage devices 120a, 120b are illustrated as connected to FC switch 108. A diagnostic system 112 is connected to FC switch 110. Each host 104 and storage device 120 may be one of a number of specific devices. The host 104 may be, for example, a server, while the storage devices 120a, 120b may be RAID devices, which in turn may be logically separated into logical units. Alternatively the storage devices 120a, 120b could be a JBOD ("just a bunch of disks") device, with each individual disk being a logical unit.

Figure 1B:
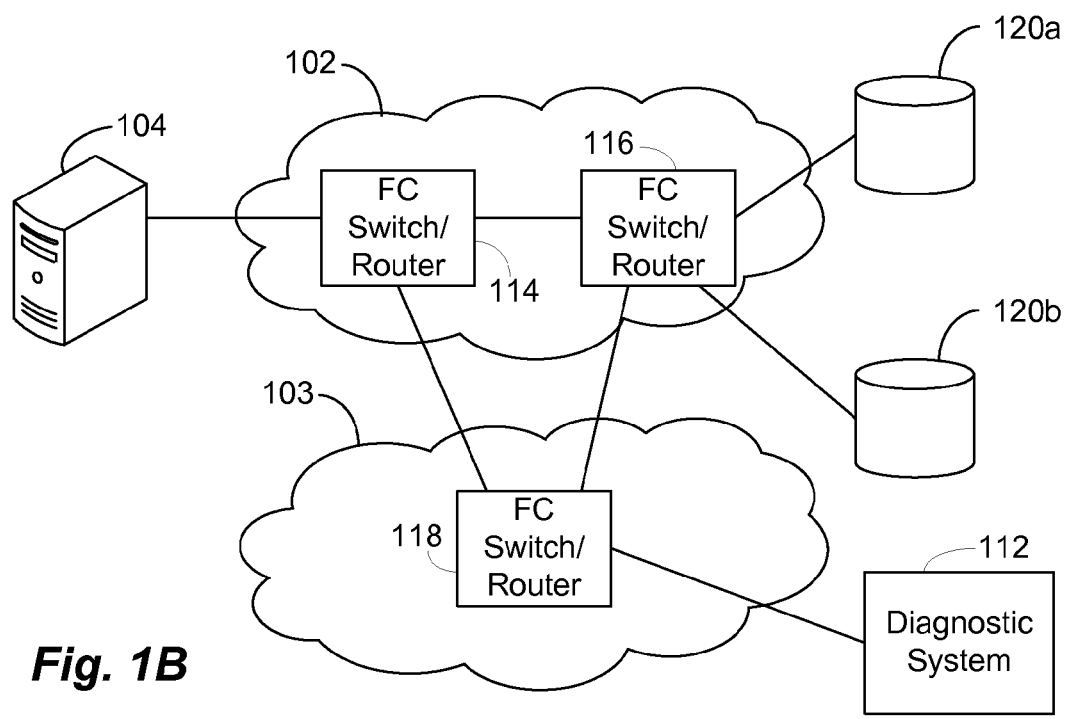
FIG. 1B is a schematic representation of a multiple fabric network according to an embodiment of the present invention.

FIG. 1B is similar to FIG. 1A, but illustrates exemplary connections in a two fabric network 101. Fabric 102 contains interconnected switch/routers 114 and 116. Fabric 103 contains switch/router 118, which is connected to both of the switch/routers 114, 116 in the illustrated embodiment. The storage devices 120a, 120b are connected to the switch/router 116 while the host 104 is connected to the switch/router 114. The diagnostic system 112 is connected to switch/router 118.

Figure 2:
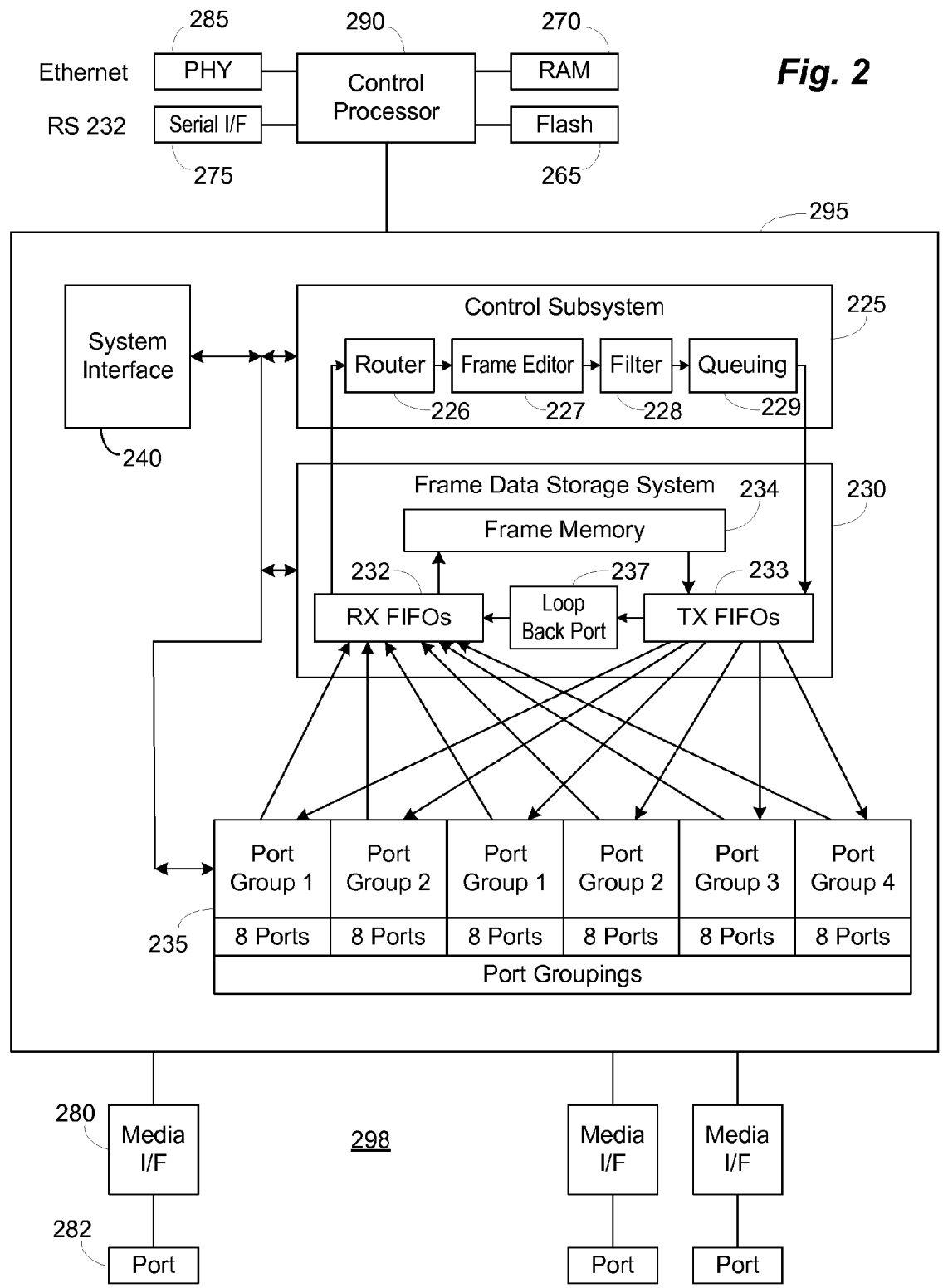
FIG. 2 is a block diagram of a network device enabling port mirroring according to an embodiment of the present invention.

FIG. 2 is a block diagram of an exemplary switch 298 which can form the switches 106, 108 or 110 or the switch/routers 114, 116, 118. A control processor 290 is connected to a switch ASIC 295. The switch ASIC 295 is connected to media interfaces 280 which are connected to ports 282. Generally the control processor 290 configures the switch ASIC 295 and handles higher level switch operations, such as the name server, the mirror requests, and the like. The switch ASIC 295 handles the general high speed inline or in-band operations, such as switching, routing and frame translation. The control processor 290 is connected to flash memory 265 to hold the software, to RAM 270 for working memory and to an Ethernet PHY 285 and serial interface 275 for out-of-band management.

The switch ASIC 295 has four basic modules, port groups 235, a frame data storage system 230, a control subsystem 225 and a system interface 240. The port groups 235 perform the lowest level of packet transmission and reception. Generally, frames are received from a media interface 280 and provided to the frame data storage system 230 by the port groups 235. Further, frames are received from the frame data storage system 230 and provided to the media interface 280 for transmission out a port 282 by the port groups 235. The frame data storage system 230 includes a set of receive FIFOs 232 and a set of transmit FIFOs 233, which interface with the port groups 235, and a frame memory 234, which stores the received frames and frames to be transmitted. A loop back port 237 is connected to the transmit FIFOs 233 and receive FIFOs 232 to allow frames to be processed in multiple passes. The frame data storage system 230 provides initial portions of each frame, typically the frame header and a payload header for FCP frames, to the control subsystem 225. The control subsystem 225 has router block 226, frame editor block 227, filter block 228 and queuing block 229. The frame editor block 227 examines the frame header and performs any necessary address translations, such as those which will happen when a frame is mirrored as described herein. There can be various embodiments of the frame editor block 227, with examples of translation operation provided in U.S. patent application Ser. No. 10/695,408 and U.S. Pat. No. 7,120,728, both of which are incorporated by reference. Those examples also provide examples of the control/data path splitting of operations. The router block 226 examines the frame header and selects the desired output port for the frame. The filter block 228 examines the frame header, and the payload header in some cases, to determine if the frame should be transmitted. The queuing block 229 schedules the frames for transmission based on various factors including quality of service, priority and the like.

This is one embodiment for performing the required frame translations and routing to accomplish mirroring as described herein. Other embodiments and different architectures can be used.

Figure 3:
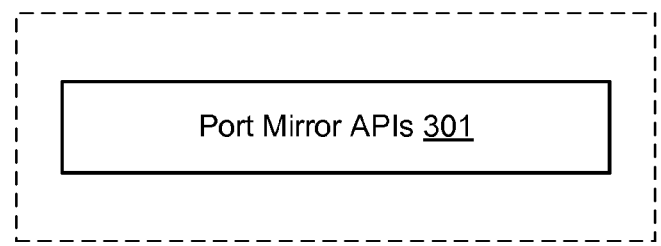
FIG. 3 is a schematic representation of a port mirroring application programming interface (API) according to an embodiment of the present invention.

As shown in FIG. 3, port mirror APIs 301 enable the switch 298 to configure the port mirroring feature. These APIs are configured to associate and disassociate input and output ports; to define an address for the diagnostic system; to define frames of interest to be mirrored, such as between a specific source and destination; and to otherwise manage the port mirror operations.

Figure 4:
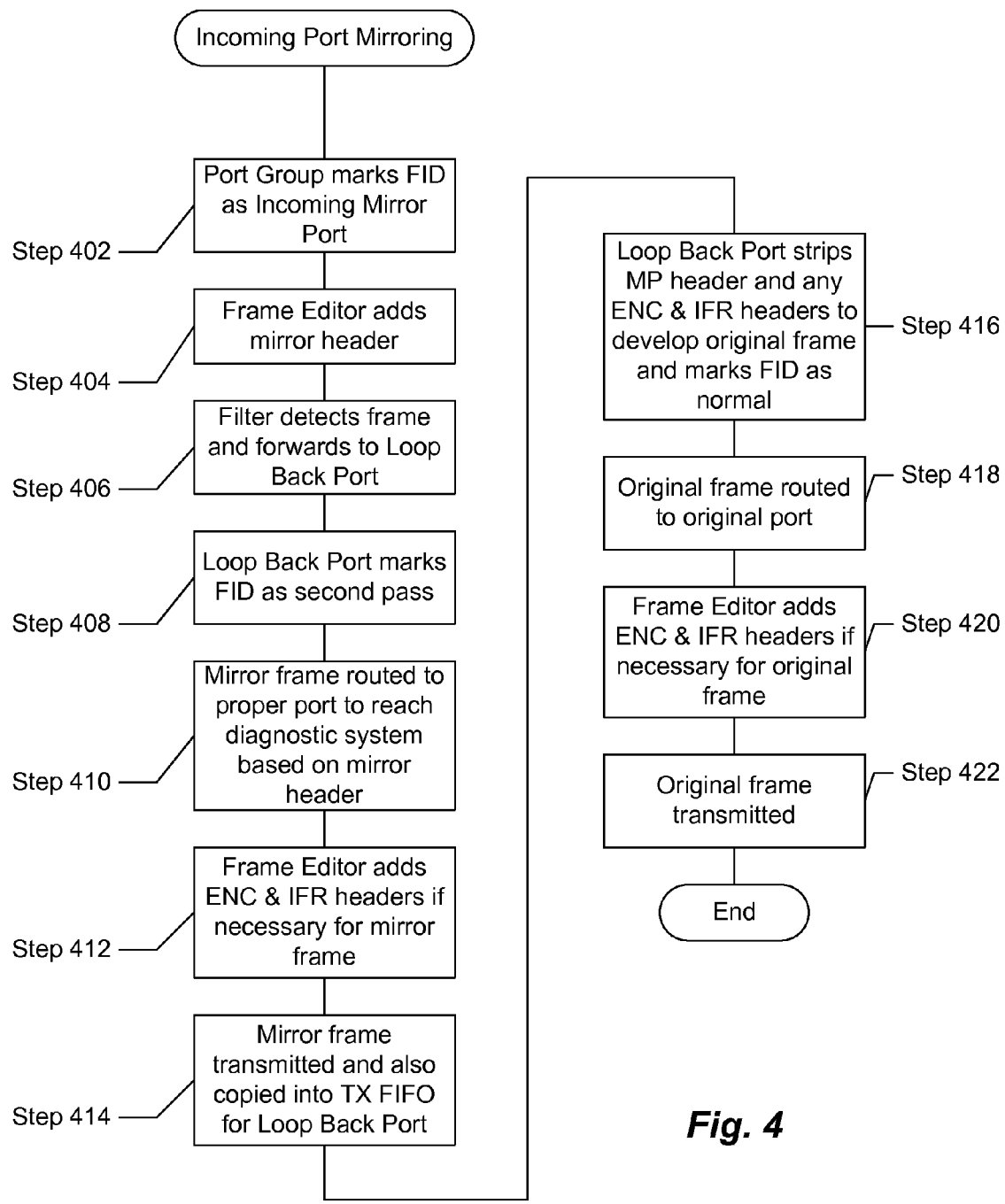
FIG. 4 is a flow chart showing a process by which port mirroring occurs at an input port according to an embodiment of the present invention.

FIG. 4 shows how input port mirroring occurs according to an embodiment of the invention. In Step 402, the port group 235 marks a frame ID (FID) with a value to indicate the frame was received at a port marked for incoming mirroring. An FID value is associated with a frame throughout its entire cycle inside the switch ASIC 295. By passing the FID, which contains pointers to the frame header and frame payload as well as status information about the frame, instead of the entire frame, data paths inside the switch ASIC 295 are simplified. Blocks obtain the header or header and payload as needed, thus minimizing the actual amount of data bits flowing inside the switch ASIC 295. In step 404, the frame editor block 227 determines from the FID value that the frame that has been received at a port designated as an input mirror port and adds a mirror header to the frame to create a mirror frame. The mirror header is a header added to the FC frame that contains a special R_CTL value indicating it is a mirror header and designating the D_ID or destination address of the diagnostic system 112. Other information can be provided in the mirror header. Alternatively an encapsulation header as used in inter-fabric routing could be used.

In step 406 the filter block 228 detects the frame and forwards it to the transmit FIFO 233, which in turn passes the frame to the loop back port 237. This causes the mirror frame to be rerouted back through the control subsystem 225. The loop back port 237 modifies the FID value to indicate a second pass in step 408. In this second pass in step 410 the router block 226 routes the frame mirror to the proper port to reach the diagnostic system and places the routing instruction in the FID. In step 412 the frame editor block 227 adds an encapsulation (ENC) header and inter-fabric routing (IFR) if the diagnostic system 112 is in a different fabric from the switch 298. The IFR header is added in all cases and the ENC header is added if a backbone or intermediate fabric is present. For further understanding of inter-fabric routing, please refer to FC-IFR, the inter-fabric routing standard from T11. The latest version is Revision 1.05, T11/09-354v1, dated Oct. 6, 2009 and is available from the T11 website, www.t11.org.

In step 414 the mirror frame is provided from the TX FIFO 233 to the proper port group 235 and a copy is also placed in the TX FIFO 233 to be provided to the loop back port 237. In step 416 the loop back port 237 strips the mirror header, and the ENC and IFR headers if present, and marks the FID to indicate a normal frame. This results in the original frame ready to be passed through the control subsystem 225. In this third pass in step 418 the router block 226 evaluates the original frame and directs it to the proper port by placing the routing value in the FID. In step 420 the frame editor block 227 adds any additional headers needed for inter-fabric routing of the original frame, such as the ENC and IFR headers. If no inter-fabric routing is needed, no headers are added. In step 422 the original frame is then provided out of the switch 298 to be provided to the destination.

Figure 5:
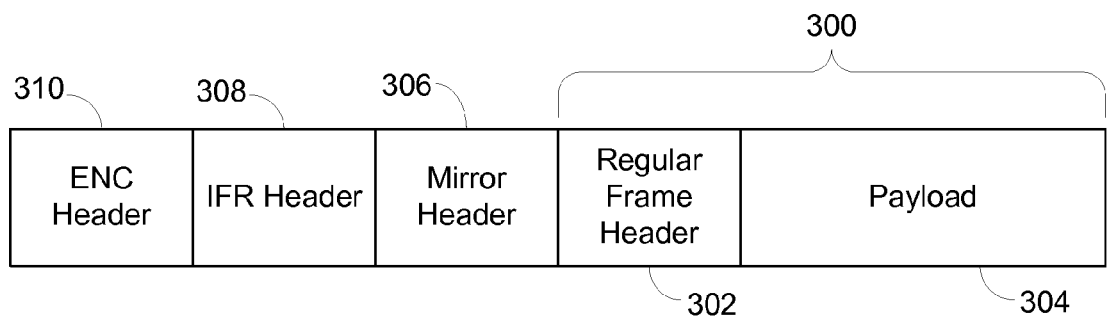
FIG. 5 is a diagram of a frame format according to an embodiment of the present invention.

FIG. 5 illustrates a sample mirror frame including ENC, IFR and mirror headers. The original frame 300 includes a regular frame header 302 and a payload 304. To this original frame 300, the mirror header 306 is appended. To the mirror header 306, the IFR header 308 is appended, and to the IFR header 308, the ENC header 310 is appended.

Figure 6:
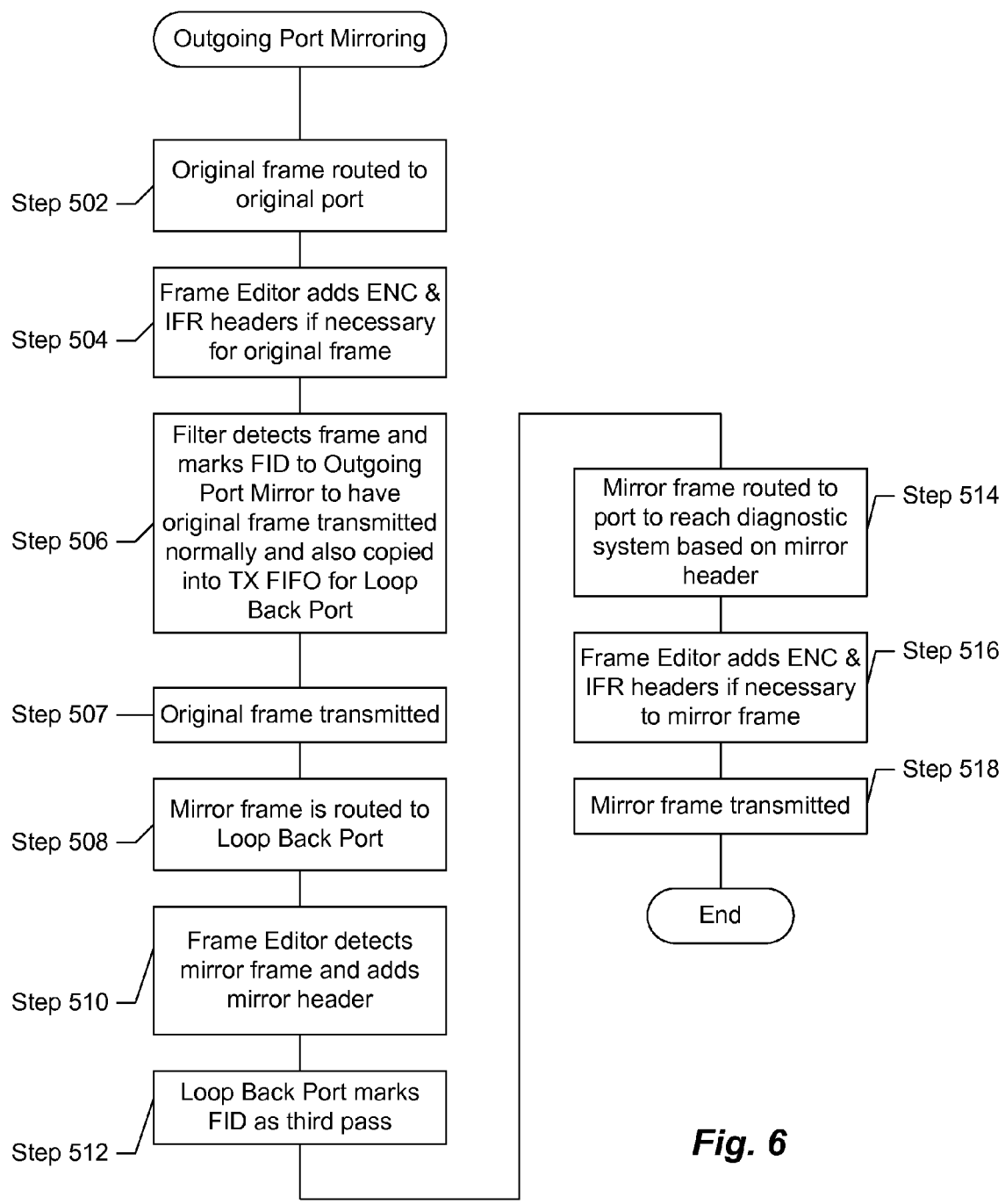
FIG. 6 is a flow chart showing a process by which port mirroring occurs at an output port according to an embodiment of the present invention.

FIG. 6 shows how output port mirroring occurs according to an embodiment of the invention. In step 502 the router block 226 routes the original frame and places the routing value in the FID. In step 504 the frame editor 227 adds the ENC and IFR headers if necessary for the original frame. In step 506 the filter block 228 detects the frame as being between the designated source and destination addresses and intended for an output mirrored port. The filter block 228 marks the FID to indicate an outgoing mirror frame so that the original frame is transmitted normally but also that a copy is made into the TX FIFO 233 for a second pass through the control subsystem 225. In step 507 the original frame is transmitted.

In step 508 the frame is provided from the TX FIFO 233 to the loop back port 237 to start a second pass. In step 510 the frame editor block 227 detects the frame as an output mirror frame by reviewing the FID and adds a mirror header. As the frame is marked as an outgoing mirror frame, it is automatically provided through the TX FIFO 233 to the loop back port 237. On the third pass, in step 512 the loop back port 237 marks the FID to indicate this is the third pass. In step 514 the router block 226 routes the mirror frame. In step 516 the frame editor block 227 adds the ENC and IFR headers if needed to the mirror frame. In step 518 the finished mirror frame is transmitted to the diagnostic system 112.

Figure 7:
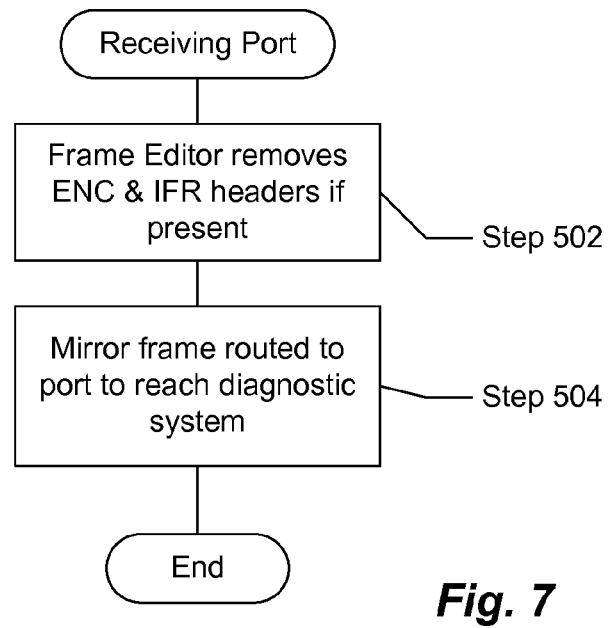
FIG. 7 is a flow chart showing a process by which port mirroring occurs at a receiving port according to an embodiment of the present invention.

FIG. 7 shows operations at the receiving port on the switch to which the diagnostic system 112 is connected. In step 502 the frame editor block 227 in the receiving switch removes the ENC and IFR headers and, optionally, the mirror header. The mirror header can be removed at this stage because the router block 226 will be able to direct the frame to the diagnostic system 112 as it is directly connected to the switch. If the diagnostic system 112 is not directly connected to the router but is rather connected to a switch elsewhere in the final fabric, the ENC and IFR headers are removed at the router and the frame with the mirror header is sent into the final fabric to reach the switch to which the diagnostic system 112 is connected. That switch can optionally remove the mirror header. The removal of the mirror header by the directly connected switch is optional and is based on the operation of the diagnostic system. If a conventional diagnostic system is used, the mirror header needs to be removed so that the diagnostic system only receives the original frames to be analyzed. In certain cases the diagnostic system may be able to operate with the mirror header in place, so the removal of the mirror header is not necessary. This embodiment allows the use of conventional switches that do not understand the presence of the mirror header. In any event, the router block 226 in the directly connected switch routes the frame in step 504 to the port which is connected to the diagnostic system 112.

By providing a mirror header and any other headers necessary for inter-fabric routing, a diagnostic system can be located as desired in the fabric and not be required to be reconnected for each diagnostic test. This greatly simplifies performing diagnostics on a fabric.

While a Fibre Channel network has been used in the exemplary embodiments, it is understood that other network protocols can be used according to the present invention. For example, in an Ethernet and IP network, Ethernet and IP mirror headers could be added to the frames being mirrored and routed similarly. As another example, in an InfiniBand network, an additional header could also be added that included the necessary routing information.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for mirroring a frame, the method comprising:
receiving an original frame at an input port;
determining if the original frame is to be mirrored;
adding a mirror header to the original frame to produce a mirror frame; and
producing a duplicate of the original frame,
wherein the determining is performed based on the input port, and
wherein the mirror frame is developed in addition to the original frame and the mirror frame is transmitted from an output port to a network prior to the original frame being transmitted from an output port to the network.

2. The method of claim 1, further comprising:
adding an inter-fabric header to the mirror frame.

3. A device for mirroring a frame, the device comprising:
an input port for receiving frames;
at least one output port for transmitting frames to a network;
mirror determination logic coupled to said input port and said at least one output port to determine if an original frame is to be mirrored;
header logic coupled to said mirror determination logic, said input port and said at least one output port to add a mirror header to an original frame to produce a mirror frame; and
frame duplication logic coupled to said input port and said at least one output port to produce a duplicate of the original frame,
wherein the determination is performed based on an input port, and
wherein the mirror frame is provided to said at least one output port for transmission to the network prior to an original frame being provided to said at least one output port for transmission to the network.

4. The device of claim 3, wherein said header logic further adds an inter-fabric header to the mirror frame.

5. The device of claim 3, wherein the duplicated frame is based on a mirror frame, and
wherein said header logic removes the mirror header to produce an original frame.

* * * * *